(12) United States Patent
Doll

(10) Patent No.: US 12,183,937 B2
(45) Date of Patent: Dec. 31, 2024

(54) MOTOR VEHICLE BATTERY MODULE, MOTOR VEHICLE HAVING AN ELECTRIC DRIVE MOTOR AND A BATTERY MODULE, AND METHOD FOR PRODUCING A MOTOR VEHICLE BATTERY MODULE AND A MOTOR VEHICLE

(71) Applicant: FREDY DOLL BETEILIGUNGS-GMBH, Achern (DE)

(72) Inventor: Fredy Doll, Achern (DE)

(73) Assignee: Pfinder KG, Böblingen (DE)

( * ) Notice: Subject to any disclaimer, the term of this patent is extended or adjusted under 35 U.S.C. 154(b) by 930 days.

(21) Appl. No.: 16/342,010

(22) PCT Filed: Oct. 25, 2017

(86) PCT No.: PCT/EP2017/077353
§ 371 (c)(1),
(2) Date: Apr. 15, 2019

(87) PCT Pub. No.: WO2018/082989
PCT Pub. Date: May 11, 2018

(65) Prior Publication Data
US 2019/0252656 A1   Aug. 15, 2019

(30) Foreign Application Priority Data
Nov. 4, 2016   (EP) .................................. 16197397

(51) Int. Cl.
*H01M 50/24*   (2021.01)
*B60K 1/04*   (2019.01)
(Continued)

(52) U.S. Cl.
CPC ............... *H01M 50/24* (2021.01); *B60K 1/04* (2013.01); *H01M 50/121* (2021.01);
(Continued)

(58) Field of Classification Search
CPC .... H01M 50/24; H01M 50/116; H01M 50/20; H01M 2220/20; B60K 1/04
See application file for complete search history.

(56) References Cited

U.S. PATENT DOCUMENTS

| | | |
|---|---|---|
| 5,106,415 A | 4/1992 | Davidian |
| 5,723,180 A | 3/1998 | Boulanger |

(Continued)

FOREIGN PATENT DOCUMENTS

| | | |
|---|---|---|
| CN | 102460816 A | 5/2012 |
| CN | 203460815 U | 3/2014 |

(Continued)

OTHER PUBLICATIONS

International Search Report issued in Application No. PCT/EP2017/077353 date of mailing Dec. 18, 2017 (7 pages).

(Continued)

*Primary Examiner* — Amanda C. Walke
(74) *Attorney, Agent, or Firm* — FLYNN THIEL, P.C.

(57) ABSTRACT

Motor vehicle battery modules having an energy content of at least 5 kWh for use as energy storage for electric cars. Such a battery module includes multiple individual batteries, each of which has at least one housing and at least one galvanic cell disposed within the housing. The battery module further includes a joining device, by which the individual batteries are assembled to form a battery module that can be handled as a whole. The battery module has, on its outside, a spray-applied protective layer that includes a wax and surrounds at least sections of the battery module.

13 Claims, 7 Drawing Sheets

(51) Int. Cl.
*H01M 50/121* (2021.01)
*H01M 50/124* (2021.01)
*H01M 50/133* (2021.01)
*H01M 50/209* (2021.01)
*H01M 50/227* (2021.01)
*H01M 50/231* (2021.01)
*H01M 50/233* (2021.01)
*H01M 50/249* (2021.01)
*H01M 50/278* (2021.01)
*H01M 50/282* (2021.01)

(52) U.S. Cl.
CPC ....... *H01M 50/124* (2021.01); *H01M 50/133* (2021.01); *H01M 50/209* (2021.01); *H01M 50/227* (2021.01); *H01M 50/231* (2021.01); *H01M 50/233* (2021.01); *H01M 50/249* (2021.01); *H01M 50/278* (2021.01); *H01M 50/282* (2021.01); *H01M 2220/20* (2013.01)

(56) References Cited

U.S. PATENT DOCUMENTS

| | | | |
|---|---|---|---|
| 8,978,804 | B2 | 3/2015 | Okada et al. |
| 9,209,483 | B2 | 12/2015 | Fuhr et al. |
| 9,755,194 | B2 | 9/2017 | Wöhrle et al. |
| 2013/0216887 | A1* | 8/2013 | Wayne ................ H01M 10/647 429/120 |
| 2014/0020969 | A1 | 1/2014 | Okada et al. |
| 2015/0140411 | A1 | 5/2015 | Li et al. |
| 2016/0211496 | A1 | 7/2016 | Hwang |
| 2016/0226042 | A1* | 8/2016 | Hartmann ............. H01G 11/82 |

FOREIGN PATENT DOCUMENTS

| | | |
|---|---|---|
| DE | 10 2008 059 971 A1 | 6/2010 |
| DE | 10 2011 079 289 A1 | 1/2013 |
| DE | 10 2015 205 481 A1 | 9/2016 |
| EP | 3048658 A1 | 7/2016 |
| KR | 1020120111686 A | 10/2012 |
| KR | 1020160088297 A | 7/2016 |
| WO | 2010/135456 A2 | 11/2010 |

OTHER PUBLICATIONS

Written Opinion issued in Application No. PCT/EP2017/077353 date of mailing Dec. 18, 2017 (8 pages).
European Patent Office Search Report issued in Application No. 16197397.9 date of mailing Dec. 15, 2016 (8 pages).
Chinese Office Action issued in corresponding Chinese Application No. 201780068278.4 dated May 28, 2021 (8 pages).
Korean Office Action issued in corresponding Korean Application No. 10-2019-7011780 dated Jun. 25, 2021 (5 pages).

* cited by examiner

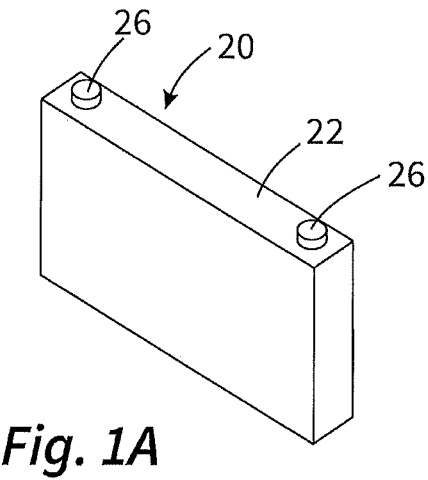
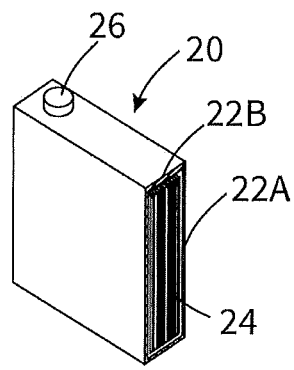
*Fig. 1A*　　*Fig. 1B*
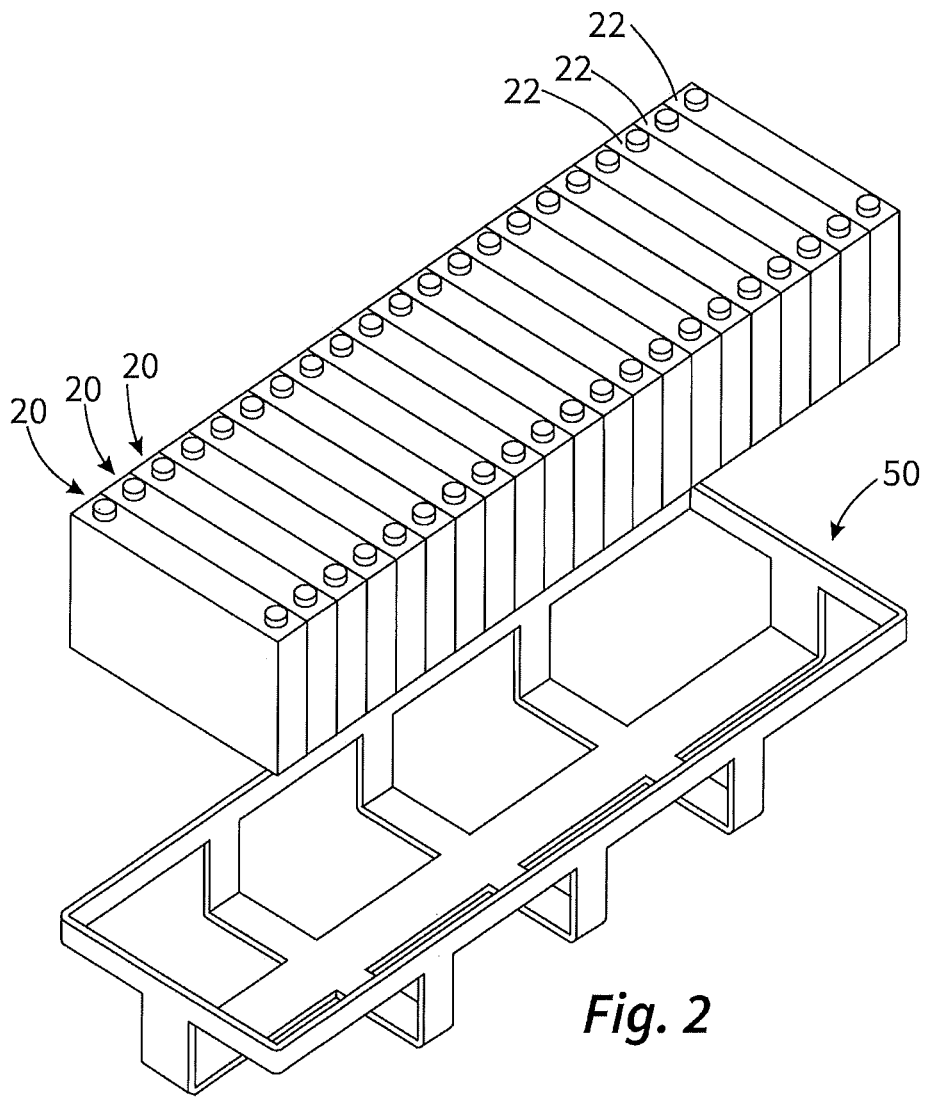
*Fig. 2*

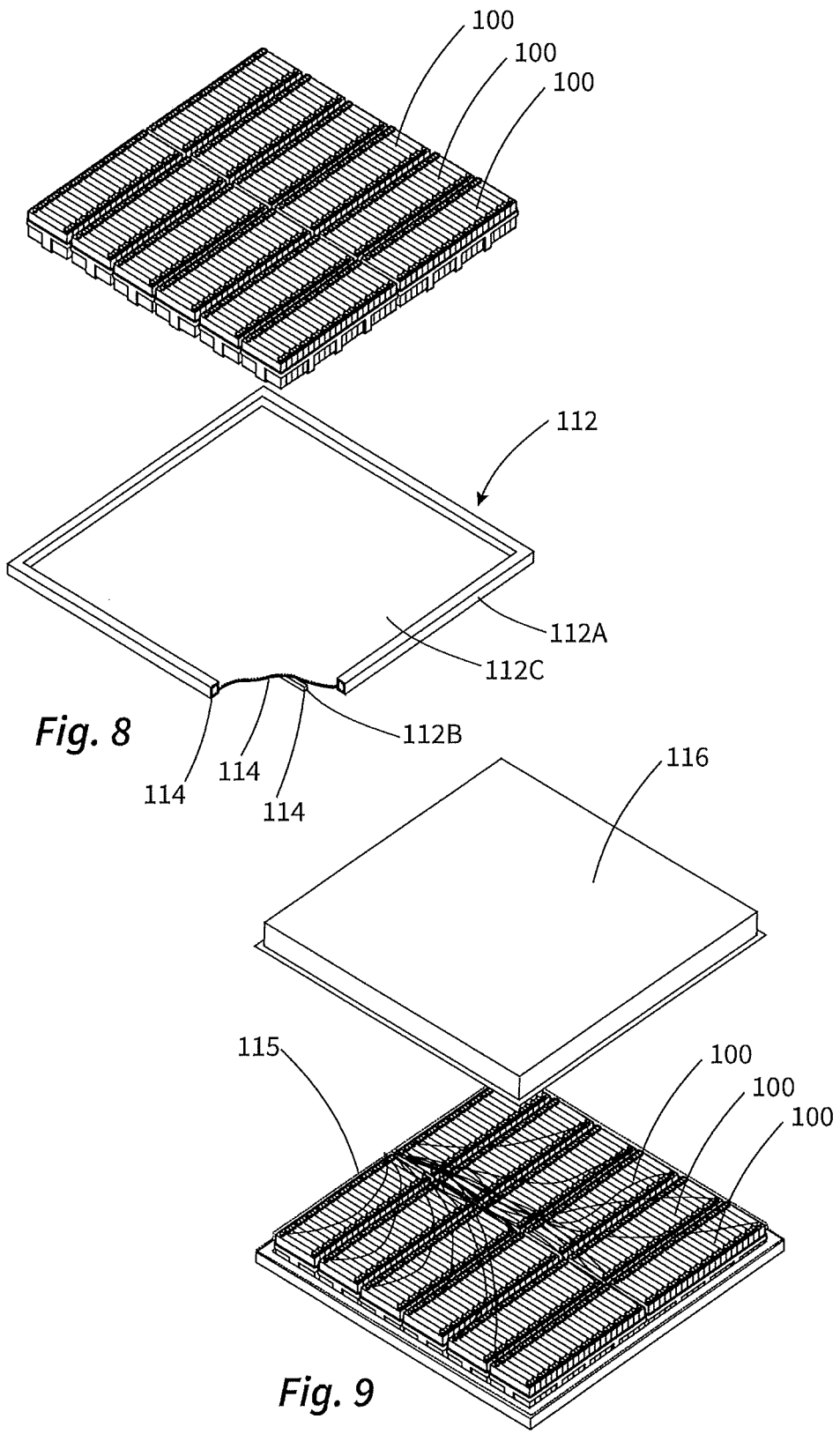

MOTOR VEHICLE BATTERY MODULE, MOTOR VEHICLE HAVING AN ELECTRIC DRIVE MOTOR AND A BATTERY MODULE, AND METHOD FOR PRODUCING A MOTOR VEHICLE BATTERY MODULE AND A MOTOR VEHICLE

FIELD OF USE AND STATE OF THE ART

The invention relates to a motor vehicle battery module having an energy content of at least 5 kWh and to a motor vehicle having an electric drive motor and at least one motor vehicle battery module for supply of the drive motor. The invention further relates to processes for producing a motor vehicle battery module and for configuring a motor vehicle with regard to corrosion resistance in the region of a battery module and a support structure to accommodate the battery module.

The electrification of the drives of motor vehicles is immediately on the verge of a breakthrough. Firstly, there is a continuous fall in battery prices per kilowatt hour. Secondly, there are ever more electric car charging points available. As a result, the fields of application of electrical vehicles is becoming ever larger, and ever broader groups of consumers are able to afford electrical vehicles.

The electrical drives of motor vehicles are generally fed by motor vehicle battery modules composed of multiple individual batteries, which in turn each comprise at least one galvanic cell and a housing within which the at least one cell is present.

Currently, individual batteries used in electric cars are virtually exclusively lithium ion batteries. Batteries of this type have high energy density, withstand a multitude of charging cycles and do not have any significant memory effect. Lithium ion batteries generally have, in the cathode, a lithiated transition metal oxide and, in the anode, a material capable of intercalation of lithium, such as graphite. The electrodes are soaked with a liquid electrolyte.

The electrolyte is a solution of a conductive salt. Conductive salts used here are especially fluorinated conductive salts such as lithium hexafluorophosphate. Solvents used are usually organic solvents, especially organic carbonates such as ethylene carbonate and propylene carbonate, cyclic ethers such as tetrahydrofuran or mixtures thereof.

A problem is that fluorinated conductive salts such as the lithium hexafluorophosphate mentioned are very reactive compounds. If an electrolyte comprising a fluorinated conductive salt escapes from a lithium ion battery, hydrofluoric acid is formed on contact with air humidity. Hydrofluoric acid is known to be an extremely corrosive and toxic substance. Hydrofluoric acid has a corrosive effect on virtually any metal. If hydrofluoric acid comes into contact, for instance, with the steel or aluminum body of a motor vehicle, damage through corrosion is unavoidable.

In principle, the housings of the individual batteries of a motor vehicle battery module are well-sealed. They frequently consist of welded or cast metal vessels and metal frames, for example of aluminum or steel, and have one or two pole bushings via which the at least one galvanic cell of the individual battery is electrically contacted. The risk of escape of electrolyte is not very high. However, the more individual batteries there are in a motor vehicle battery module, the greater the rise in the risk of electrolyte escape, especially in the region of the pole bushings. The shaking and vibrations that are to be expected in the context of a motor vehicle can also lead to failure of the housing and electrolyte escape.

Corrosive constituents are also present in batteries of other kinds, and so, in most battery modules for driving vehicles, there is fundamentally the risk that constituents that are intended to be encapsulated can escape, and these can damage the vehicle body.

The aim in vehicle construction is that bodies remain largely free of corrosion damage over several decades. This period currently still exceeds the period over which battery modules are used. The aim should therefore be that a battery, toward the end of its use cycle and with the associated rising risk in electrolyte escape, in the event of failure, should not cause damage to the body that continues to be usable.

OBJECT AND ACHIEVEMENT

It is an object of the present invention to discover a technical solution to alleviate or to remedy the adverse consequences of such electrolyte escape, especially the corrosion damage mentioned.

A motor vehicle battery module of the invention is a battery module for an electrically driven vehicle and therefore has a comparatively high energy content of at least 5 kWh. Typical total energy contents of the energy storage means of electric cars are typically between 20 kWh and 100 kWh, and this can be achieved by means of one or more battery modules. A battery module of the invention therefore has an energy content between 5 kWh and 200 kWh, preferably between 20 and 100 kWh.

Such a battery module comprises multiple individual batteries, preferably a two number of individual batteries, that are typically connected in series. The individual batteries each have a housing that accommodates at least one galvanic cell of the individual battery. This housing forms the primary protection against the escape of the electrolyte. The housings are preferably prismatic and usually have a shell body and a lid body that are welded to one another. Nevertheless, the problem underlying the invention is that the welding or else seals in the region of pole bushings of the housing can become worn after a few years, such that the electrolyte can then escape. The housings may, as mentioned at the outset, be welded or cast metal containers, for example of aluminum or steel. Plastic housings are also possible.

The individual batteries mentioned are combined in a battery module, this being achieved via a joining device. The joining device is a device that bundles the individual batteries in a mechanical manner, such that the individual batteries can subsequently, in the course of assembly, be moved together and inserted into a vehicle.

According to the invention, the battery module thus formed by the individual batteries and the joining device is covered at least in sections by a protective layer that acts as corrosion protection, which covers either the entire battery module or part-areas that are particularly at risk.

This protective layer serves primarily not for protection of the battery module but for protection of the body. What is achieved by the protective layer is that electrolyte or constituents thereof that escapes from a damaged individual battery in liquid form or in gaseous form cannot come into contact with parts of the body. However, the protective layer additionally also has the effect that escaping electrolyte can only to a lesser degree get into the region of individual batteries adjacent to the damaged individual battery and cause damage therein.

The joining device may comprise an outer housing that completely surrounds the individual batteries. In this case, the protective layer has been applied to the outside of the outer housing and at least predominantly covers this outer layer.

In the case of such a configuration, the outer housing forms additional protection for the case of a defective individual battery. Only when there is damage both in the housing of the individual battery and in the surrounding housing of the module is there escape of electrolyte or a component thereof. In that case, the protective layer applied to the outside of the outer housing prevents this escaping medium from reaching parts of the body.

In addition, an additional protective layer can, however, in this case too be applied directly to the individual batteries inserted into the outer housing, such that additional protection is achieved.

As an alternative to an outer housing that encompasses the individual batteries in a fully insulating manner, the joining device may alternatively only partly surround the individual batteries, such that outer faces of the housing of the individual batteries simultaneously form the outer face of the battery module. In this case, the protective layer takes the form of a common protective layer that covers at least sections of the outer faces of the housing of a multitude of individual batteries.

Such a joining device may be formed like a cage or tray that combines the individual batteries to form a unit. The housings of the individual batteries form sections of the outside of the battery module and are accordingly covered at least in sections by the protective layer provided in accordance with the invention by spraying. More particularly, that side of the housing of the individual batteries on which the poles are provided may remain accessible through the joining device, such that the connection of the individual batteries can be achieved after combination of the individual batteries to form a battery module.

The joining devices may take the form of cages, housings or half-shells of plastic or metal, especially steel or aluminum.

A motor vehicle of the invention is equipped with an electrical drive motor and at least one motor vehicle battery module for supply of the drive motor. The motor vehicle also has at least one battery module having a multitude of individual batteries that are combined with one another to form a battery module having an energy content of at least 5 kWh. This battery module is of the type described above.

The motor vehicle has a body comprising a support structure to accommodate at least one above-described battery module, especially a tray-like support structure.

Preferably, this body has likewise been provided, in the region of the support structure, with a protective layer that coats the surfaces of the support structure. Thus, it is not just the protective layer on the battery module that reduces the risk of corrosive constituents of the electrolyte coming into contact with parts of the body; the parts of the body that are at particular risk have additionally likewise been provided with a spray-applied protective layer. The support structure may especially comprise hollow profiles. In order that securing holes or the like in these hollow profiles do not result in the risk of ingress of escaped electrolyte or its constituents, these hollow profiles are preferably also provided with a protective layer sprayed on from the inside.

A support structure of the vehicle preferably accommodates multiple battery modules provided individually with a protective layer. Especially preferably, these have been provided collectively with a further spray-applied protective layer, preferably after electrical connection between the battery modules has been achieved, such that the cabling for this purpose is ensheathed by this further protective layer.

In addition, the entirety of the battery modules accommodated in the support structure is preferably covered by a lid. It is considered to be advantageous when this is covered once again by a protective layer.

In the ideal case, the aim is thus that, a support structure provided with a spray-applied protective layer accommodates battery modules provided individually with a spray-applied protective layer, which are provided once again with a common spray-applied protective layer before they are covered by a lid, the outside of which is also coated with a spray-applied protective layer.

The corresponding process of the invention for producing a motor vehicle battery module envisages that multiple individual batteries each comprising at least one galvanic cell and a housing within which the at least one cell is present are joined to one another to form a battery module that can be handled as a whole.

On the outside of the battery module, by means of a spraying operation, a protective layer of a sprayable spray material suitable for solidification is then applied, and this, after solidification, forms the protective layer that surrounds at least sections of the battery module.

The spray material that subsequently forms the protective layer described on the outside of the battery module is preferably deployed manually by means of a spray gun or by means of a robot-guided spray tool. The operation of applying the spray material may be envisaged at various points in the manufacturing chain of the vehicle. For instance, it is firstly possible to provide the battery modules with the protective layer at a different time and optionally a different place from the insertion into the vehicle body and then to deliver it to the vehicle manufacturer in appropriate transport packaging. Alternatively, the spray operation can, however, also be effected at the vehicle manufacturer, which means that it is possible to conduct the application of the protective layer both on the battery module itself and on parts of the body together, i.e. with the same spraying apparatus and/or at the same spraying station in the course of vehicle production.

In the case that the individual batteries are joined to give a battery module by means of a common outer housing that completely surrounds multiple individual batteries collectively, the spraying operation preferably provides the outside of this outer housing with the protective layer. The protective layer is either applied to the entire outer layer or nearly (>90°) the entire outer layer, or else it is applied only selectively in regions at particular risk, for example in the region of the dividing line between two housing shells.

In the case that the individual batteries are joined to give a battery module by means of an open joining device that encompasses multiple individual batteries collectively, with sections of the housings of the individual batteries forming the outside of the battery module, the spraying operation preferably provides the exposed outside of the housings of the individual batteries with a common protective layer. In this case, in the course of a continuous spraying operation, a common protective layer is applied to several of the individual batteries, especially in the region of the housing side on which the poles of the individual batteries are provided.

It is considered to be advantageous when the individual batteries are already connected to one another prior to application of the protective layer. In one configuration with a surrounding outer housing, this is usually absolutely necessary since, after application of the protective layer, opening of the outer housing is typically no longer possible without damaging the protective layer. In one configuration with a joining device that leaves the housing of the individual batteries clear, the connecting wires applied for the purpose of connection between the individual batteries are also wetted by the protective layer. There is no need to free the poles from the insulating protective layer after the spraying operation.

It may also be advantageous when, for protection of at least one contact section for connection of the battery module, prior to application of the protective layer, this contact section is provided with a temporary cover. Such temporary covers may be provided, for example, in the form of small plastic caps that are pushed over the pole contacts prior to the spraying.

The process of the invention for configuring a motor vehicle with regard to corrosion resistance in the region of a battery module and a support structure for accommodation of the battery module envisages that the battery module is provided with an anticorrosion layer before or after insertion into the support structure by means of the above-described process.

It is advantageous when, prior to the insertion of the battery module into the support structure, surfaces of the support structure are also provided with a protective layer, where this protective layer on the support structure preferably consists of the same spray material as the protective layer of the battery module and is especially preferably applied in the course of a common spraying operation by means of the same spraying apparatus.

Especially in a process in which the spray application of the protective layer immediately precedes the insertion of the battery into the vehicle body, one option is to provide not just the battery module itself but also the regions of the body at risk in the immediate environment of the battery module with the protective layer. This achieves a further protection measure against corrosion.

The protective layer that finds use in the above-described battery module and optionally the body-side support structure serves to protect the body from corrosion, since electrolyte liquid that escapes in liquid or gaseous form or constituents thereof are prevented from reaching parts of the body and causing damage. There follows an elucidation of what demands should preferably be made on the spray material.

It is preferable that the spray material is designed to form an electrically insulating protective layer. For this purpose, it generally comprises exclusively components that are electrically nonconductive or can be converted to an electrically nonconductive state. However, the spray material and the protective layer formed thereby need not have the same properties since, in the course of spraying or of subsequent curing, volatile partial constituents can outgas for example. All that is of relevance is that the protective layer formed has the electrically insulating effect mentioned. This effect typically exists in the case of oily or waxy preservatives. Correspondingly, the spray material and hence the protective layer as well preferably comprises a wax.

Components of suitable spray material are generally a layer-forming component and optionally a carrier component, which is generally a solvent or dispersant in which the layer-forming component is dissolved or dispersed. In the absence of a carrier component, the layer-forming component is generally itself in liquid form, in order that its sprayability is assured.

Suitable layer-forming components are, for example, commercially available waxes as find use in the field of cavity preservation of motor vehicles, provided that they do not contain electrically conductive additives that impart electrically conductive properties to a spray material formed therefrom and/or to a protective layer formed therefrom.

The wax is preferably a mineral oil-based wax, especially a paraffin wax.

More preferably, the wax, especially the mineral oil-based wax, more preferably the paraffin wax, has a solidification point in the range from 30 to 95° C., more preferably from 35° C. to 85° C.

In further particularly preferred embodiments, the spray material, as well as the wax, as further layer-forming component, additionally includes a binder, especially a binder which, after solidification, has a thermal stability of at least 100° C., more preferably of 120° C. After solidification, such a binder is capable of forming a matrix incorporating the wax. Even at temperatures above the 100° C. mentioned, especially the 120° C. mentioned, the matrix is maintained.

While a wax can be solidified by mere cooling, the solidification in the case of a binder, as is well known, is effected by physical drying (i.e. the removal of a solvent) and/or by a chemical reaction.

The combination of the wax and the binder enables the provision of particularly thin protective layers having thicknesses of only a few µm. The sole use of a binder can likewise lead to effective protection layers; for effective corrosion protection, the layers must be formed solely from binders but generally have a thickness of distinctly more than 100 µm or else be in multilayer form. In combination with the wax, significantly smaller thicknesses are sufficient.

As binder, the spray material may comprise, for example, alkyd resins, acrylic resins, polyesters, urethanes, native and synthetic oils with OH functionality, oxidized waxes and petrolatums, and hydrocarbon resins with OH functionality. These binders generally have at least one functional group selected from the group consisting of the amino groups, the carboxyl groups and the hydroxyl groups.

In preferred embodiments, the layer-forming component comprises a combination of at least one of the binders and at least one hardener. The person skilled in the art is aware of combinations of binders and hardeners suitable for the purpose. The binders mentioned can be combined, for example, with hardeners based on amines, peroxides, diisocyanates and mixtures thereof. Specific examples of such hardeners include diphenylmethane diisocyanate, hexamethylene diisocyanate, toluene diisocyanate, isophorone diisocyanate and derivatives of these compounds.

Preferably, the binder is free of solvents that have to be removed in the solidification and/or for solidification of the layer-forming component.

More preferably, the spray material comprises, as well as the wax, as binder, a binder crosslinkable oxidatively and/or by means of radiation which is capable of forming the matrix incorporating the wax, especially based on polyester. Suitable examples of these are polyester resins with free-radically crosslinkable side chains.

In further preferred embodiments, the spray material comprises, as well as the wax, a urethane resin, an alkyd resin or an acrylic resin.

In preferred embodiments, one or more additives that affect the processing properties of the spray material or the properties of the protective layer may be added to the layer-forming component. Such additives may, for example, be anticorrosion additives such as calcium sulfate, fillers such as talc, rheological additives, catalysts that affect curing of a binder, and plasticizers that affect the extensibility and elasticity of the protective layer. Examples of useful plasticizers include phthalates such as diethylhexyl phthalate. Polyurethane-based polymers, for example, have a particularly good insulating effect.

In accordance with the above remarks, the spray material, in preferred embodiments, does not comprise any components that are electrically conductive or cause the protective layer formed to be electrically conductive.

As carrier component, the spray material may in principle also contain a solvent which is removed in the solidification and/or for solidification of the layer-forming component, for example an organic solvent or water. However, it is more preferably free of such solvents.

More preferably, the spray material comprises, as carrier component, a mineral oil, especially a mineral oil composed of saturated catenated and/or saturated cyclic and/or aromatic hydrocarbons. Mineral oils generally do not have a sharp melting point, but have a boiling range that may be very broad. Diesel fuel, for example, has a boiling range of over several hundred degrees Celsius. More preferably, the mineral oil is not removed in the consolidation and/or for consolidation of the layer-forming component like the abovementioned solvents, but is incorporated into the matrix formed by the binder like the wax. For this purpose, it preferably does not comprise any components that boil below 40° C., preferably below 60° C., more preferably below 80° C. More preferably, the boiling range of the mineral oil is in the range from 80° C. to 120° C.

In the present context, the carrier component serves primarily to dissolve wax and to adjust the viscosity of the spray material. The shear viscosity of the spray material at 23° C. (determinable to DIN 53019-1/DIN EN ISO 3215) is preferably adjusted to a value in the range from 80 to 240 mPas, preferably in the range from 150 to 190 mPas. This is preferable especially when the carrier component, as well as the wax, includes the binder described as a further layer-forming component. In order that the flashpoint of the spray material remains low, preferably no mineral oils having excessively low-boiling components are used for the purpose. The flashpoint (determinable to DIN EN ISO 2719) is preferably above 120° C.

More preferably, the spray material comprises the following components in the following proportions:
- 5% by weight to 15% by weight of the wax as layer-forming component,
- 10% by weight to 40% by weight, preferably 15% by weight to 35% by weight, of the binder as a further layer-forming component,
- 30% by weight to 60% by weight of additives, and
- 5% by weight to 15% by weight of the mineral oil as carrier component, preferably 5% by weight to 10% by weight of the mineral oil as carrier component.

Said proportions add up to 100% by weight in the spray material.

The spray material is preferably designed to form a solidified protective layer having an elongation at yield of at least 4%. This takes account of the fact that, in the context of motor vehicles, shaking and vibrations in operation is to be expected, which are more likely to cause an excessively rigid layer with low elongation at yield to crack and hence cause the risk of at least partial loss of the protective effect.

The spray material is preferably applied in an amount that leads, in covered regions of the outside of the battery module, to a layer thickness of the protective layer between 5 µm and 0.5 mm. Although greater layer thicknesses are also possible according to the material, it has been found that lower layer thicknesses are generally sufficient. Moreover, layers of greater thickness have an increased tendency to crack. More preferably, the layer thickness is between 5 µm and 50 µm, more preferably between 15 µm and 20 µm. It is thus well below customary layer thicknesses of paint coatings. Within these preferred ranges, the actual layer thickness can be chosen depending on the roughness of the surface to be coated. In the case of low roughness, preference is given to choosing a thickness at the lower end of the ranges stated.

In particularly preferred embodiments, it is also possible to add reservoirs having fire-smothering or fire-retardant ingredients, especially $CO_2$, that are embedded into the protective layer to the layer-forming component and hence to the spray material.

In the event of fire, these reservoirs, present in the form of small capsules for example, are opened by the heat and release fire retardant. This may be, for example, $CO_2$ in bound form. Such pigmentation may already be introduced in the course of production of the wax.

It has been found that, as well as specific spray materials that are produced for this end use, typical oily or waxy preservatives for cavity preservation are also usable. These are obtainable, for example, from Fuchs Schmierstoffe GmbH and Pfinder KG. Using such preservative waxes may be advantageous since they find use in the course of vehicle construction in any case and it can imply simplification of the manufacturing processes when the application of such waxes to parts of the body and to the battery modules is combined in the course of manufacture.

BRIEF DESCRIPTION OF THE DRAWINGS

Further advantages and aspects of the invention are apparent from the claims and the description which follows of preferred working examples of the invention, which are elucidated hereinafter with reference to the figures.

FIGS. 1A and 1B show an individual battery in the complete and cross-sectional state, where such individual batteries are combined as intended to form battery modules.

FIG. 2 shows a multitude of individual batteries and a cage-like joining device for combining the individual batteries to form a battery module.

FIGS. 8 to 10 show the bundling of battery modules to form an overall battery.

DETAILED DESCRIPTION OF THE WORKING EXAMPLES

FIG. 1A shows an individual battery 20 as used in a battery module of the invention. This individual battery 20 has a housing 22 having drillholes and contact sections 26 at two points. FIG. 1B shows the individual battery 20 as a cross section. It can be seen that, within the housing 22, there is disposed a galvanic cell 24 with alternating positive and negative electrodes separated by separators. It is also apparent that the housing 22 has a shell body 22A and a lid 22B. According to the specific configuration of the individual battery, these are bonded to one another in various ways, for example welded, in order that the electrolyte likewise present in the housing 22 cannot run out or escape in gaseous form. As well as these contact lines between the shell body 22A and a lid 22B, the pole bushings, which are not shown in detail, in the region of the contact sections 26 are fundamentally at risk of becoming leaky in the course of wear of the individual battery, such that electrolyte could escape here.

Figure 3:
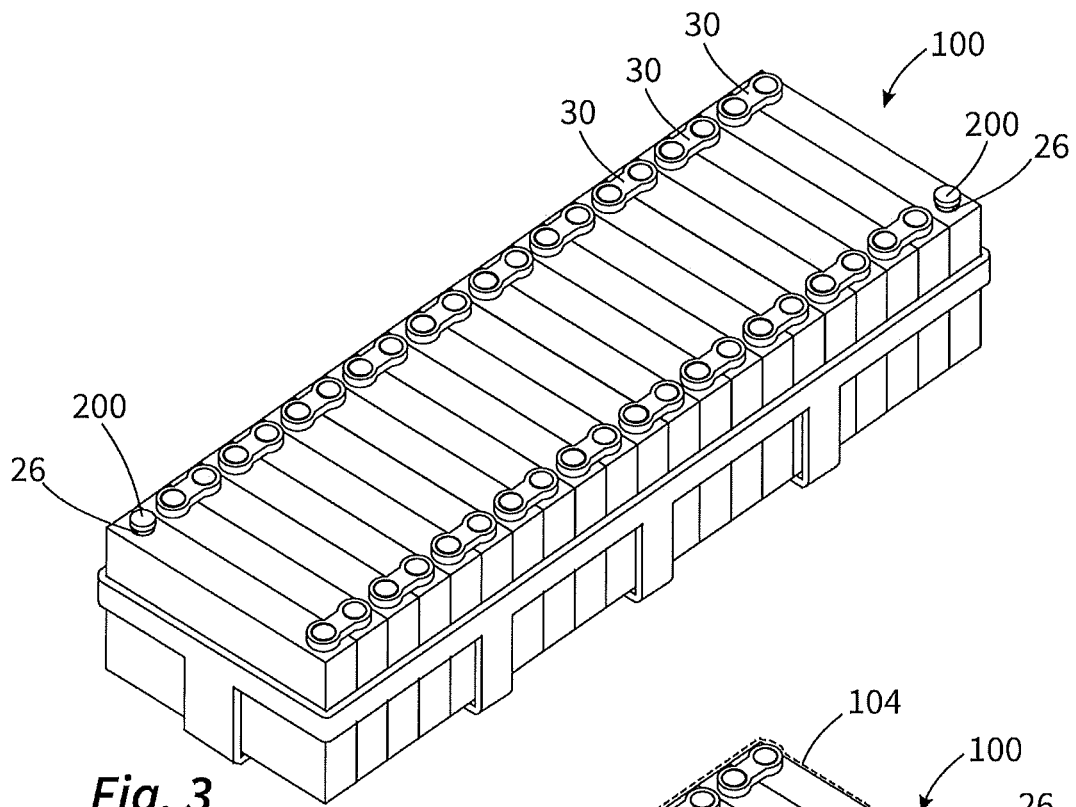
FIG. 3 shows the battery module that results from combining of the individual batteries into the joining device according to FIG. 2.
Figure 4:
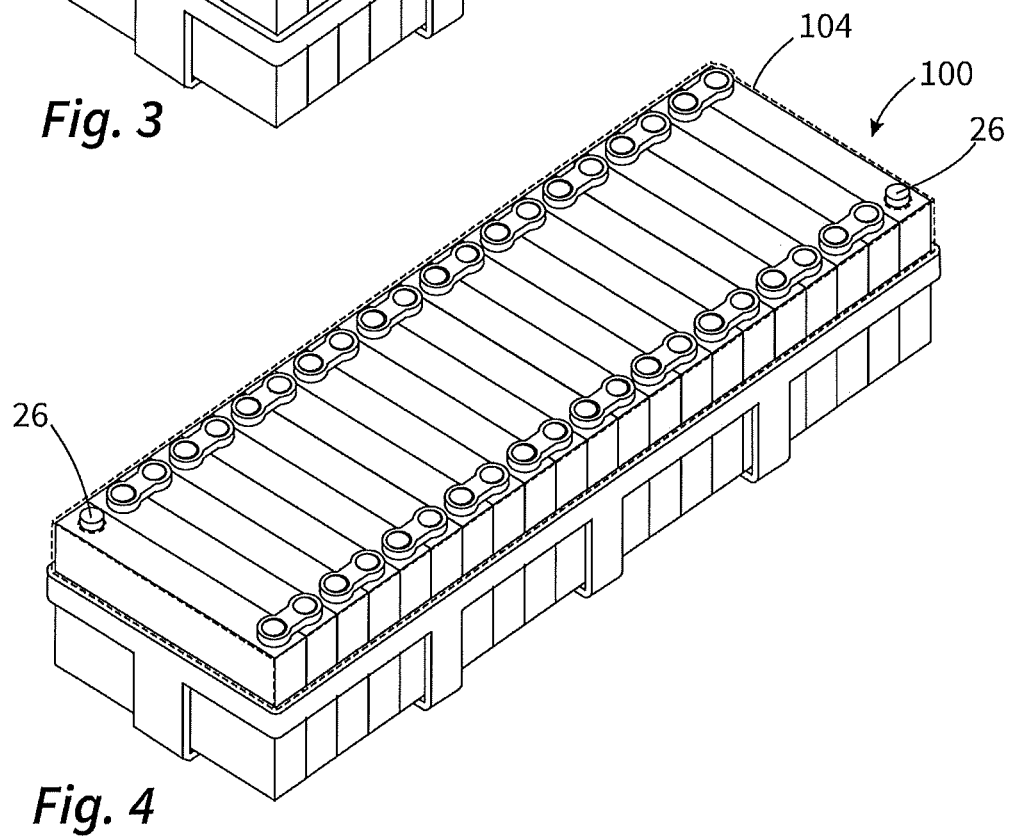
FIG. 4 shows the battery module of FIG. 3 after application of a protective layer.

FIGS. 2 to 4 on the one hand and 5 to 7 on the other hand show different variants of battery modules constructed from such individual batteries.

In the case of the configuration of FIGS. 2 to 4, a kind of cage is provided as joining device 50, which serves the purpose of accommodating a multitude of individual batteries 20, such that these can be handled together later on in the assembly process. FIG. 3B shows the assembly state of the essentially finished battery module 100. The individual batteries 20 have been inserted into the joining device 50 mentioned and are connected to one another in series by connectors 30. In this state of FIG. 3, the battery module 100 is utilizable in principle. However, the sole protection from escape of the electrolyte from the individual batteries 20 is the respective housing 22.

Therefore, a further protective layer 104 is provided, which is applied after the exposed contact sections 26 have first been provided with temporary covers 200. As is apparent from FIG. 4, the protective layer is mounted in the upper part of the battery module, where it covers all the individual batteries 20 collectively. The application is effected, for example, by means of a spray gun or by a robot spraying tool. The layer thickness is preferably about 0.3 mm. In the case of use of a spray material having a combination of the above-described wax and the binder, the layer thickness is preferably between 5 μm and 50 μm. If there is then failure of a housing 22 of an individual battery 20, the electrolyte that emerges cannot escape freely at first since it is below the protective layer 104. Although there is of course the risk that this will also fail owing to the corrosive action of the electrolyte, the risk is nevertheless reduced that the electrolyte can come into contact with parts of the body and have corrosive action there. It is also apparent from FIG. 4 that, after removing the temporary covers 200, the contact sections 26 are ready for connection of the power cables. The covers 200 caused them to remain clear of hollow material in the spraying operation.

Figure 5:
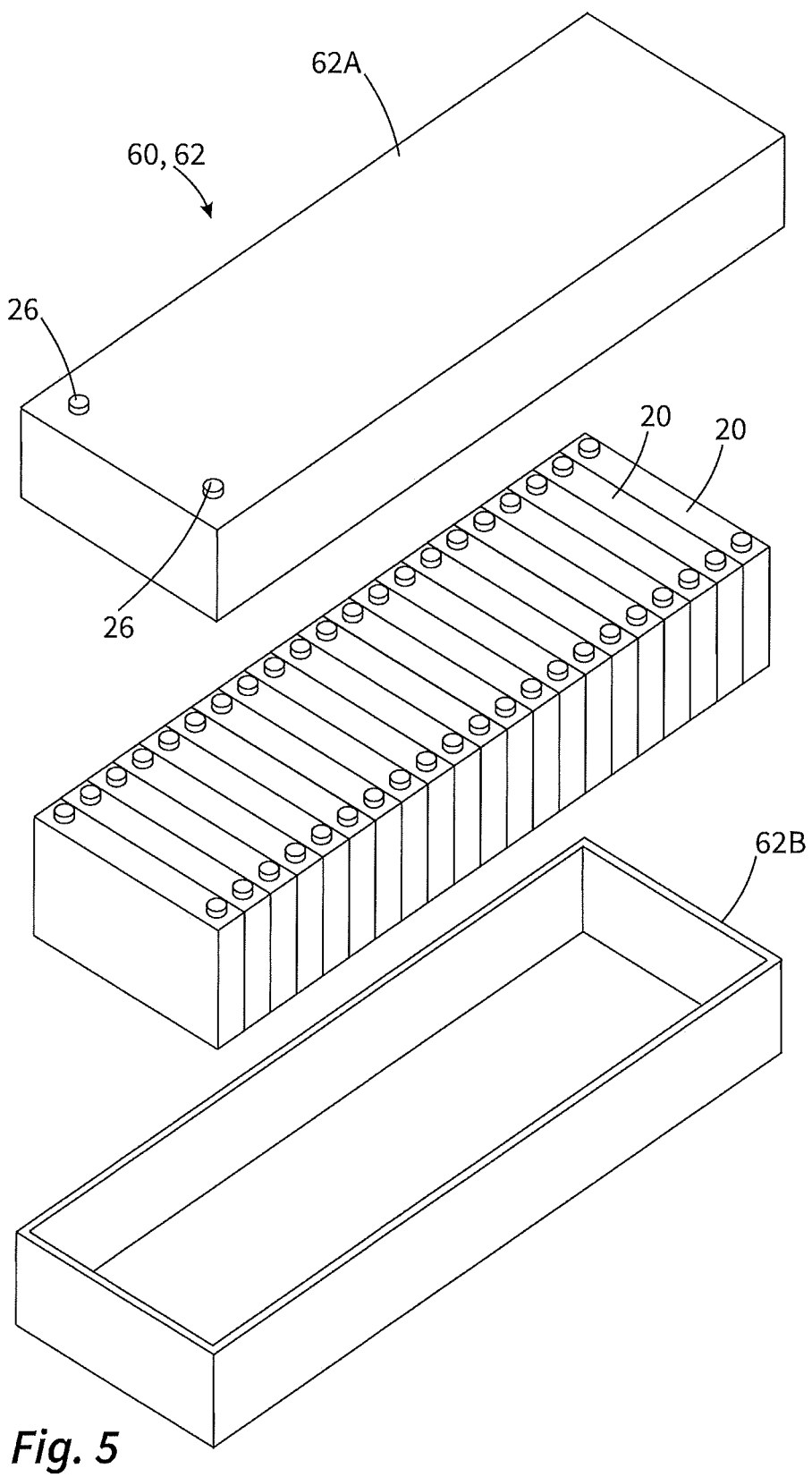
FIG. 5 shows a multitude of individual batteries and a housing-like joining device for combination of the individual batteries to form a battery module.

In the configuration according to FIG. 5, the joining device 60 that combines the individual batteries 20 to form a battery module 100 that can be handled collectively has been provided in the form of an outer housing 62 having a housing shell 62B and a housing lid 62A. Contact sections 26 are also provided on the housing lid 62A, which are connected to the contact sections 26 of the individual batteries 20 in a manner not shown in detail.

Figure 6:
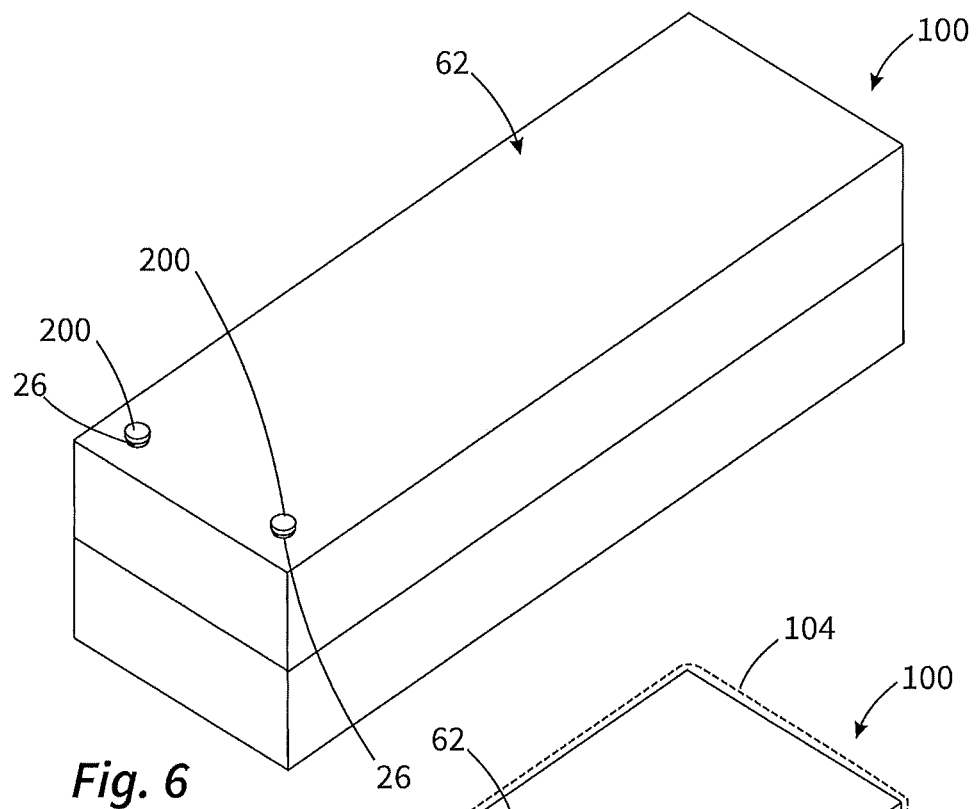
FIG. 6 shows the battery module that results from combining of the individual batteries into the joining device according to FIG. 5.
Figure 7:
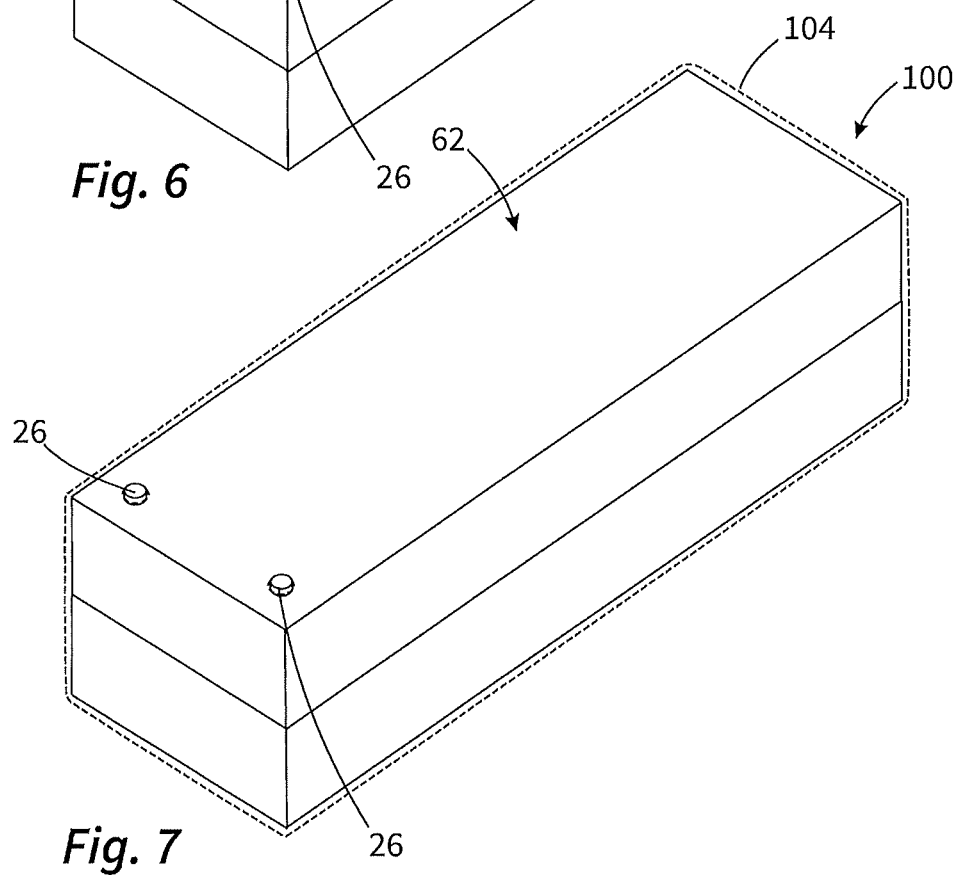
FIG. 7 shows the battery module of FIG. 6 after applying a protective layer.

In this configuration, the individual batteries 20 are first inserted into the housing shell 62B and then this is closed by the housing lid 62A. It is possible in accordance with the invention, after the insertion of the individual batteries 20 into the housing shell 62B and prior to mounting of the housing lid 62A, to directly provide a protective layer in the manner illustrated in FIGS. 2 to 4. Alternatively or additionally, however, this protective layer may also be applied only when the outer housing 62 is closed, as shown in FIG. 6. In that case, in a similar manner to that already described above, the contact sections 26 are provided with temporary covers 200 in order subsequently to apply the protective layer 104 which in turn has a thickness of about 0.3 to 0.5 mm. In the case of the configuration of FIGS. 5 to 7, this protective layer surrounds the outer housing 62 completely except for the contact sections 26. However, there would also be conceivable configurations in which just the immediate environment of the contact sections 26 and a region around the contact region 64 of the housing parts is provided with a protective layer. As already mentioned, the thickness of the protective layer is preferably lower in the case of use of the combination of the above-described wax and the binder, namely between 5 μm and 50 μm.

Figure 10:
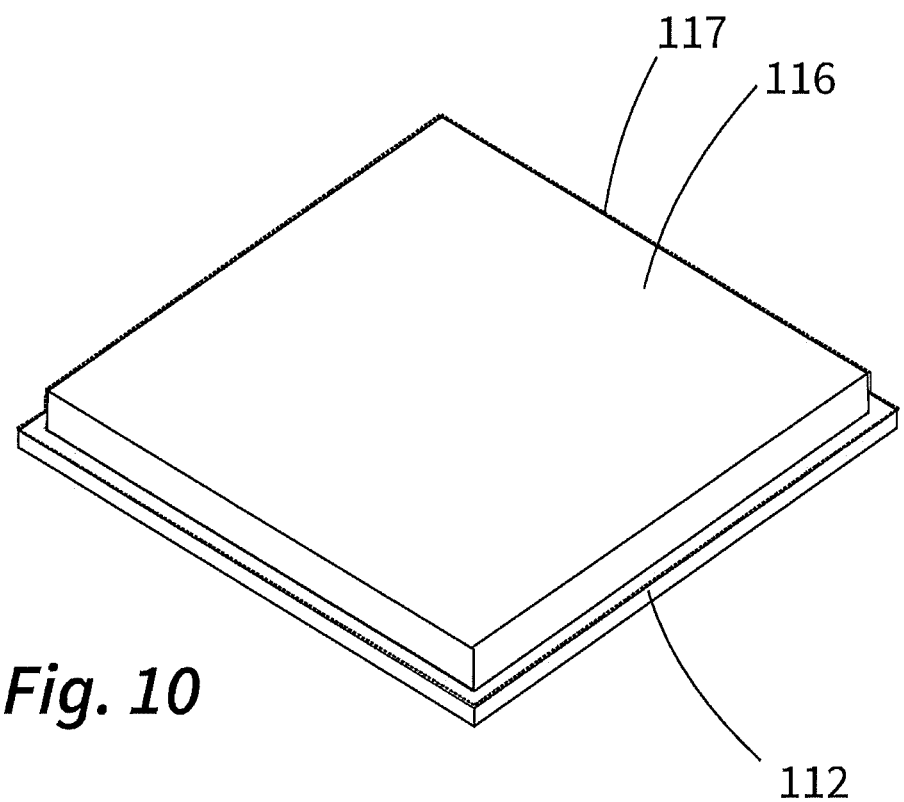

FIGS. 8 to 10 show a support structure 112 for the battery modules 100. The support structure 112 in the present case accommodates a total of twelve battery modules 100. It consists of hollow profiles 112A, 112B and a base sheet 112C. The support structure has been coated with a protective layer 114, and this protective layer 114 has also been provided within the hollow profiles 112A, 112B in order to prevent corrosion here by entering electrolyte constituents. The risk of such ingress exists particularly owing to securing holes and the like.

The battery modules 100 are inserted into the support structure 112 thus prepared in the manner illustrated in FIG. 9, secured therein and then connected to one another therein. Subsequently, a further protective layer 115 composed of the same or another oily or waxy spray material that collectively covers the battery modules 100 and optionally also the cabling is applied.

Finally, the support structure 112 with the inserted battery modules 100 is covered by a common lid 116, which is once again covered by a further protective layer 117, as illustrated in FIG. 10.

Figure 11:
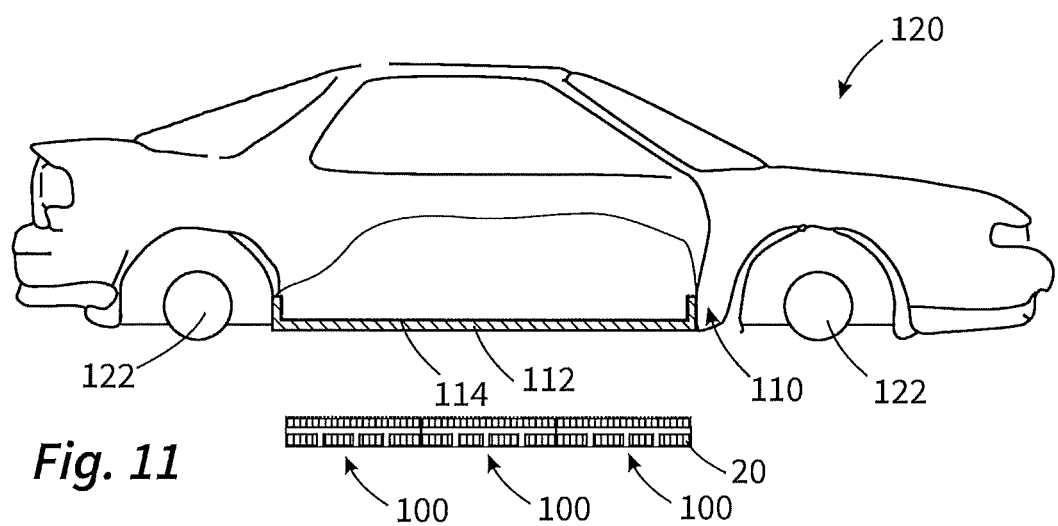
FIG. 11 shows a vehicle body and the accommodation region of this body provided for accommodation of battery modules.
Figure 12:
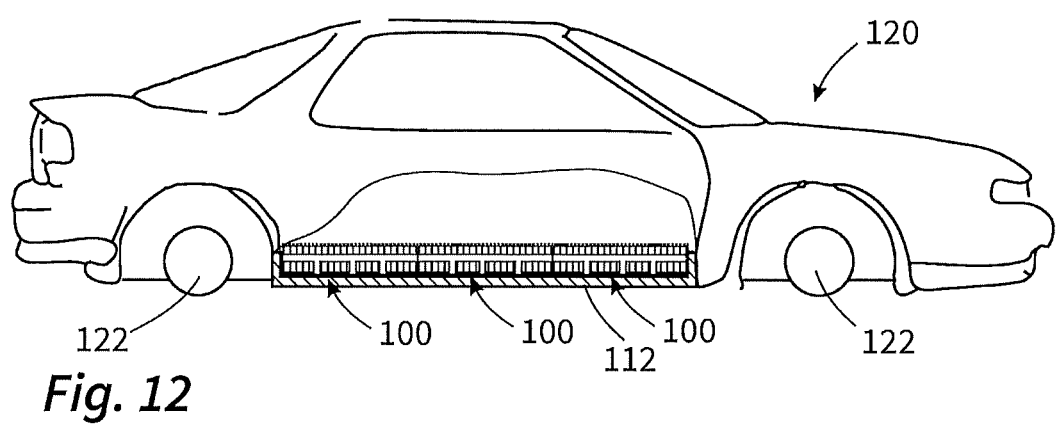
FIG. 12 shows the vehicle body with inserted battery modules.

FIGS. 11 and 12 illustrate installation into the body 110 of a motor vehicle 120. Such a motor vehicle for which the battery modules of the invention are intended has at least one electric drive motor 122 to drive the motor vehicle. The battery module(s) is/are typically accommodated in the base of the vehicle. For this purpose, an accommodation tray is provided as support structure 112, which may be designed according to FIGS. 8 to 10. As illustrated in FIG. 11, the battery modules 100 are inserted into said accommodation tray. The risk that typically exists of batteries failing over the many years of service life of such a motor vehicle and leading to relevant weakening of the vehicle body in the region of the accommodation tray is counteracted by the protective layer 104 of the battery modules 100. In addition, in the manner apparent in FIG. 11, a protective layer 114 may also be provided on the surfaces of the parts of the body themselves that bear the battery modules 100, in the present case on the inside of the support structure 112 configured as an accommodation tray.

The invention claimed is:

1. A motor vehicle battery module comprising:
multiple individual batteries, each of which has at least one housing and at least one galvanic cell disposed within the housing;
a joining device, by which the individual batteries are assembled to form a battery module that can be handled as a whole;
the battery module has, on an outside thereof, a spray-applied protective layer having a thickness between 5

μm and 50 μm that comprises a wax and surrounds at least sections of the battery module;
wherein the wax is incorporated into a matrix of a binder; and
the motor vehicle battery module having an energy content of at least 5 kWh.

2. The motor vehicle battery module as claimed in claim 1, wherein:
the joining device comprises an outer housing that completely surrounds the individual batteries, and
the protective layer is applied to the outside surface of the outer housing and at least predominantly covers the outside surface.

3. The motor vehicle battery module as claimed in claim 1, wherein:
the joining device only partly surrounds the individual batteries, such that outer faces of the at least one housing of the individual batteries simultaneously form an outer face of the battery module, and
the protective layer covers at least the outer faces of the at least one housing of a multitude of the individual batteries.

4. The motor vehicle battery module as claimed in claim 1, wherein:
the protective layer comprises a spray material, wherein the spray material includes, as wax, a paraffin wax having a solidification point in the range from 30 to 95° C.

5. The motor vehicle battery module as claimed in claim 4, wherein:
the spray material comprises a mineral oil as a carrier component.

6. The motor vehicle battery module as claimed in claim 4, wherein:
the spray material is free of solvents that have to be removed in solidification of layer-forming components.

7. The motor vehicle battery module as claimed in claim 4, wherein:
the spray material has a shear viscosity at 23° C. (determinable to DIN 53019-1/DIN EN ISO 3215) in the range from 80 to 240 mPas.

8. The motor vehicle battery module as claimed in claim 1, wherein:
the protective layer comprises a spray material, wherein the spray material includes, as a further layer-forming component, a binder that forms, after solidification, a matrix incorporating the wax.

9. The motor vehicle battery module as claimed in claim 8, wherein:
the binder is a binder crosslinkable by oxidation and/or by radiation.

10. The motor vehicle battery module claimed in claim 1, wherein:
the protective layer comprises a spray material designed to form a solidified protective layer having an elongation at yield of at least 4%; and/or
an average layer thickness is between 5 μm and 0.5 mm; and/or
the spray material comprises a layer-forming component in which the layer-forming component is dissolved or dispersed; and/or
the spray material comprises reservoirs containing fire-smothering or fire-inhibiting contents that are embedded into the protective layer; and/or
the spray material is electrically nonconductive and/or designed to form an electrically insulating protective layer.

11. A motor vehicle comprising an electric drive motor and at least one of the motor vehicle battery module as claimed in claim 1.

12. The motor vehicle as claimed in claim 11, further including:
a body comprising a support structure to accommodate the at least one of the motor vehicle battery module,
wherein the body is provided, in a region of the support structure, with a protective layer that coats surfaces of the support structure.

13. The motor vehicle as claimed in claim 11, wherein:
the at least one of the motor vehicle battery module comprises a multitude of battery modules, the multitude of battery modules being present in a support structure, and
the multitude of battery modules are collectively covered by at least one further spray-applied protective layer and/or the multitude of battery modules are covered by a common lid on an outside of which a further spray-applied protective layer has been provided.

* * * * *